US008656364B1

(12) United States Patent
Kolawa et al.

(10) Patent No.: US 8,656,364 B1
(45) Date of Patent: Feb. 18, 2014

(54) SYSTEM AND METHOD FOR ENFORCEMENT OF BUSINESS RULES USING STATIC ANALYSIS

(75) Inventors: Adam K. Kolawa, Bradbury, CA (US); Wayne P. Ariola, Jr., Los Angeles, CA (US); Daniel J. Dominguez, Azusa, CA (US)

(73) Assignee: Parasoft Corporation, Monrovia, CA (US)

( * ) Notice: Subject to any disclaimer, the term of this patent is extended or adjusted under 35 U.S.C. 154(b) by 443 days.

(21) Appl. No.: 13/085,254

(22) Filed: Apr. 12, 2011

Related U.S. Application Data

(60) Provisional application No. 61/323,194, filed on Apr. 12, 2010.

(51) Int. Cl.
*G06F 9/44* (2006.01)
(52) U.S. Cl.
USPC .......................................................... 717/126
(58) Field of Classification Search
None
See application file for complete search history.

(56) References Cited

U.S. PATENT DOCUMENTS

| | | | | |
|---|---|---|---|---|
| 8,332,864 B2* | 12/2012 | Bose et al. | | 718/106 |
| 8,468,491 B2* | 6/2013 | Markovic | | 717/102 |
| 2005/0096937 A1* | 5/2005 | Subash et al. | | 705/1 |
| 2006/0242466 A1* | 10/2006 | Tillmann et al. | | 714/38 |
| 2007/0050364 A1* | 3/2007 | Cummins | | 707/9 |
| 2007/0168987 A1* | 7/2007 | Vetillard et al. | | 717/126 |
| 2007/0277162 A1* | 11/2007 | Tanaka et al. | | 717/140 |
| 2009/0235225 A1* | 9/2009 | Killisperger et al. | | 717/101 |
| 2011/0086610 A1* | 4/2011 | Baldwin et al. | | 455/405 |
| 2012/0131487 A1* | 5/2012 | Leonard | | 715/771 |

OTHER PUBLICATIONS

"A method for Validating the Compliance of Business Processes to Business Rules", Araujo et al., 2010 ACM 9.*

* cited by examiner

*Primary Examiner* — Don Wong
*Assistant Examiner* — Daxin Wu
(74) *Attorney, Agent, or Firm* — Christie, Parker & Hale, LLP (57) ABSTRACT

A method for enforcing business rules in a computer program, using static analysis. The method includes: storing a plurality of business rules corresponding to a plurality of business processes representing a behavior of an enterprise; parsing a representation of business processes in the computer program to create a parse tree; extracting execution paths from the parse tree; creating control flow graphs and data flow graphs from the extracted execution paths, wherein the created control flow graphs and data flow graphs adhere to one or more of the stored business rules; following the created control flow graphs and data flow graphs; applying said one or more of the stored business rules to the created control flow graphs and data flow graphs; and reporting whether any of the applied rules is violated.

14 Claims, 4 Drawing Sheets

SYSTEM AND METHOD FOR ENFORCEMENT OF BUSINESS RULES USING STATIC ANALYSIS

CROSS REFERENCE TO RELATED APPLICATIONS

This Patent Application claims the benefits of U.S. Provisional Patent Application Ser. No. 61/323,194, filed on Apr. 12, 2010 and entitled "Enforcement Of Business Rules Using Static Analysis," the entire content of which is hereby expressly incorporated by reference.

FIELD OF THE INVENTION

The present invention relates generally to computer software; and more particularly to a system and method for enforcement of business rules using static analysis.

BACKGROUND

Static analysis refer to statically analyzing computer code to monitor whether it meets uniform expectations about reliability, performance, and maintainability. Static code analysis provides a foundation for producing solid code by exposing structural errors and preventing entire classes of errors. Generally, an effective static analysis encompasses static source code (pattern based) analysis, data flow static analysis, and code metrics analysis.

Pattern-based code analysis monitors whether code follows industry-standard or customized rules for ensuring that code meets uniform expectations around security, reliability, performance, and maintainability.

Data flow static analysis provides automated detection of runtime errors without requiring the software to actually be executed. It statically simulates application execution paths, which may cross multiple units, components, and files. Data flow static analysis can automatically detect potential runtime errors such as resource leaks, NullPointerExceptions, SQL injections, and other security vulnerabilities. This enables early and effortless detection of critical runtime errors that might otherwise take weeks to find.

While static source code is an error prevention practice, data flow static analysis is an error-detection practice. The main difference between static source code analysis and data flow static analysis is that with pattern-based static code analysis, one can be ensured that certain classes of defects will not occur as long as the coding constructs known to cause these defects are found and fixed. With data flow static analysis, defects that could actually occur when real application paths are exercised are identified—not just dangerous coding constructs.

Code metrics analysis calculates various metrics for computer code to help assess code base and monitor changes. It identifies brittle or overly-complex code that could impede agility or reuse. It also helps better understand code complexity and assess the potential impacts of an anticipated code change.

Static analysis has been applied to conventional programming languages, such as C++ and JAVA™ for analyze the structure of the language. However, with ever growing popularity of business process, service oriented, and web service orchestration languages, there is a need to not only test the structure of the language, but also, test the behavior of the business process or enterprise.

SOAP, originally stood for "Simple Object Access Protocol", but it now refers to a more generalized protocol for any service oriented protocol. SOAP is currently an XML-based messaging framework for exchanging structured and typed information between peers in a decentralized, distributed environment. Extensible Markup Language (XML) is a meta-markup language for describing data objects. SOAP is typically implemented in XML and relies on XML namespaces and XML schemas to define document types that describe messages. SOAP describes a simple messaging (request/response) mechanism (for example, Remote Procedure Calls (RPC)). That is, a SOAP client sends a request (e.g., a RPC request) to a SOAP server. The SOAP server then replies by sending a response (e.g., a RPC response) to the SOAP client.

Web Services Description Language (WSDL), also typically implemented in XML, is used to describe the types of requests accepted by a particular Web service. It is used to communicate meta-information about the Web service and, as such, is not strictly necessary for invoking the Web service itself.

Business Process Execution Language (BPEL) provides a language for Web service orchestration in terms of processes and activities. The activities include primitive activities such as receiving and replying to messages, invoking services, and simple data manipulation as well as structured activities such as sequence and flow that can be hierarchically arranged to create sophisticated business logic.

BPEL depends on WSDL (Web Service Description Language), in which all services that are accessed through BPEL are done so through the abstract interface described in WSDL. Adherence to this abstraction is part of what facilitates easy integration of heterogeneous components in BPEL, because it matters not what language or platform a particular component is implemented with, so long as it exposes its functionality as a service described in a WSDL.

Typically, BPEL processes need to be executed by a runtime engine that supports a number of requirements, including native support for Web service standards as well as asynchronous messaging, process persistence, and transactional models consistent with long-term processes.

XPDL (the XML Process Definition Language) is an emerging standard in the area of Business Process Management (BPM). XPDL is a standardized format for interchanging business process definitions between different workflow products (e.g., different modeling tools and management suites). At this point, it seems that XPDL is emerging as an intermediate language that most systems will use to describe business processes.

SUMMARY

In some embodiments, the present invention is a computer implemented method for enforcing business rules in a computer program, using static analysis. The method includes: storing a plurality of business rules corresponding to a plurality of business processes representing a behavior of an enterprise; parsing a representation of business processes in the computer program to create a parse tree; extracting execution paths from the parse tree; creating control flow graphs and data flow graphs from the extracted execution paths, wherein the created control flow graphs and data flow graphs adhere to one or more of the stored business rules; following the created control flow graphs and data flow graphs; applying said one or more of the stored business rules to the created control flow graphs and data flow graphs; and reporting whether any of the applied rules is violated.

In some embodiments, the present invention is a computer implemented method for enforcing business rules in a computer program, using static analysis. The method includes:

storing a plurality of pattern-based business rules corresponding to a plurality of business processes representing a behavior of an enterprise; parsing a representation of business processes in the computer program to create a parse tree; applying one or more of the stored business rules to the parse tree; and reporting whether any of the applied rules is violated.

In some embodiments, the present invention is a computer implemented method for enforcing business rules in a computer program, using static analysis. The method includes: storing a plurality of business rules corresponding to a plurality of business processes representing a behavior of an enterprise; executing the computer program; extracting execution paths from the computer program being executed; creating control flow graphs and data flow graphs from the extracted execution paths; applying said one or more of the stored business rules to the created control flow graphs and data flow graphs while the computer program is being executed; and reporting whether any of the applied rules is violated.

DETAILED DESCRIPTION

In some embodiments, the present invention is a static analysis tool executed on one or more computers and including business rules for analyzing business processes, such as XPDL. The invention includes three types of rules: pattern-based rules, flow-based rules, and runtime rules. These three types of rules are similar to the three types of static analysis rules used for programming languages, and are implemented in a similar manner.

In some embodiments, business rules for static analysis rules are created, for example, by automated static analysis rule creation (such as RuleWizard™ tool by Parasoft Corp.™). The created business rules enforce code that represents the behavior of an enterprise. The business rules identify code which does not conform to the behavior of the enterprise. The rule may be edited to apply to more specific or general cases. By running these business rules using static analysis, one can find all separate instances of the business process violations.

The software tool for rule creation (such as Rule Wizard™ from Parasoft™ Corporation) presents rules graphically, and allows for business rule customization and rule addition. Business rules are stored in proprietary formats or open formats like, XML or UML. A Control User Interface (UI) drives scanning and analysis and provides configuration. A Presentation UI presents analysis results to the user.

Once these static analysis business rules have been implemented to enforce the behavior of an enterprise (business processes), similar to coding standard enforcement, they are included in a static analysis configuration and can be run to ensure that violations are identified as soon as they are introduced. A detail description of enterprise test generation is disclosed in U.S. patent application Ser. No. 11/746,489, "System And Method For Enterprise Test Generation And Execution," the entire contents of which are hereby incorporated by reference.

Coding standards enforcement is static analysis of source code for certain rules and patterns to detect problems automatically based on the knowledge collected over many years by industry experts. Coding standards offer substantial value to software development organizations because they are prepackaged automated error prevention practices. That is, they close the feedback loop between a bug and what must be done to prevent that bug from reoccurring.

For example, for a programming language such as C++, a pattern-based rule might parse the source code in order to check that a class does not have too many inheritances. Whereas programming pattern-based rules check patterns in the language's code, pattern-based business rules check patterns in the (business) process graph. For instance, an equivalent rule for business processes might check that a process does not have more than three decision makers. Similarly, another pattern-based business rule could check that a process is structured so that the central decision maker needs to approve every decision from the people he or she supervises.

Therefore, testing is extended with static analysis of (business) process graphs extracted during the execution of the code. Execution paths are extracted during parsing process. Then, Control Flow Graphs (CFGs) and/or Data Flow Graphs (DFGs) are created for each business process with adherence to the business rules. In some embodiments, this is done by a business process execution engine. Each business process is executed, and during runtime, the process execution is monitored for adherence to the business rules. In some embodiments, the business process is instrumented to allow the process execution itself to perform the checking based on the business rules.

A code analyzer then attempts to follow the created CFGs and DFGs, and apply the business rules to the created CFGs and DFGs to detect defects in the behavior of the enterprise. A detail description of enterprise test generation is disclosed in U.S. patent application Ser. No. 12/202,009, entitled "System And Method For Generating Unit Tests Based On Recorded Execution Paths," and U.S. patent application Ser. No. 11/557,454, now U.S. Pat. No. 7,900,193, entitled "System And Method For Detecting Defects In A Computer Program Using Data And Control Flow Analysis," the entire contents of which are hereby incorporated by reference.

Moreover, a flow-based business rule could check a flow-related requirement. For example, consider a system that drives a loan approval process. A flow-based rule for this process might be "Any loan for more than $10,000 requires a credit check."

In some embodiments, the present invention includes a software application for determining, storing and analyzing process (control flow and data flow) graphs and based on those graphs, identifying code which does not conform to the behavior of the enterprise. The software application may include: a language specific front end in a form of a source code parser, an intermediate language parser or the like to parse the source code to retrieve and represent important information about control flow, data flow, variables, types, functions, and the like. The software application also includes: an application programming interface (API) for retrieving and representing important information during the execution, in other words, to see what was executed; a scanner for scanning files in a project and retrieving required information to populate a repository using, for example, an API.

The repository is responsible for collecting information about execution paths in a project. This repository is also responsible for optimizing the access to the information. An analyzer is the framework for various analyzing algorithms. A default algorithm may use business rules from a variety of rule sets to recognize certain patterns in the process graphs that violate the business rules under enforcement. Other algorithms can be easily plugged in utilizing repository features for defects detection.

Figure 1:
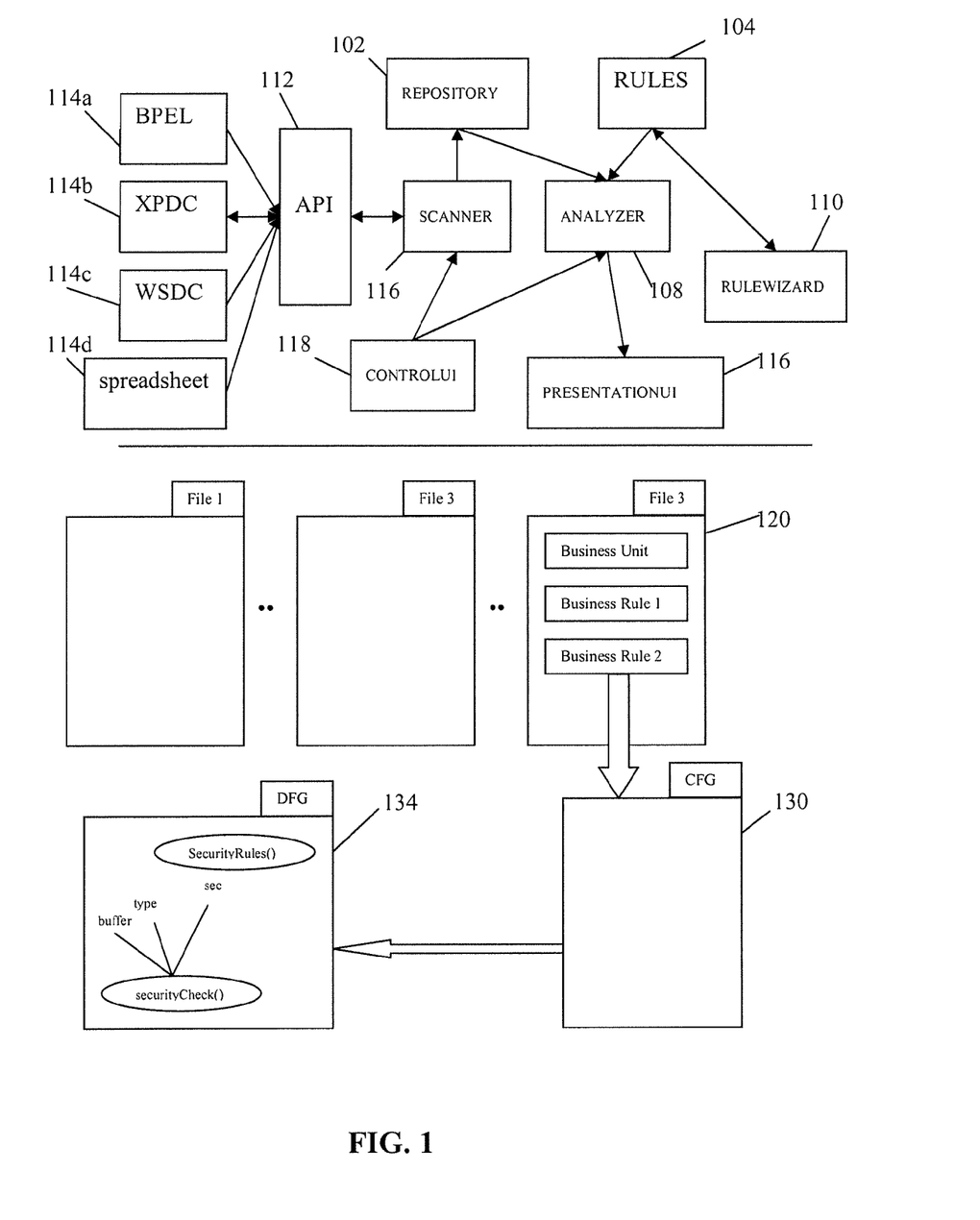
FIG. 1 shows a simplified block diagram for an exemplary software development process, according to some embodiments of the present invention.

FIG. 1 is an exemplary system diagram, according to some embodiments of the present invention. A language specific front end analyzes files with source code, byte code, or intermediate language. For example, this can be a BPEL parse tree 114a, a XPDL parse tree 114b, a WDSL parse tree 114c, or any other business language which can be represented as a parse tree. This can also be a spreadsheet 114d from which a business process is then generated. In this case, rules are enforced directly in the spreadsheet. This front end also provides API implementation.

An API 112 retrieves information about control flow, data flow, variables, types, functions, and the like, during execution. A scanner 106 utilizes the API 112 to scan files 120 in a project and retrieves required information to populate a repository 102.

The repository 102 collects information about files 120 in a project. This repository is also responsible for optimization and access to the optimization information. For a better performance, a fast access to information like Control Flow Graphs (CFG) 130 and/or Data Flow Graphs (DFG) 134 for a given function, and all implementations of a given virtual function are provided.

An analyzer 108 is a framework for various analyzing processes. A default analyzing process uses business rules from rules sets to recognize certain patterns in the flow graphs which violate the business rules under enforcement. Other processes can be easily plugged in utilizing the Repository features for defects detection.

A sets of business rules 104 to be enforced by the analyzer 108 are available. A rule creation tool 110 such, as Rule Wizard™ that presents the business rules graphically and allows for rules customization and addition can be used with the present invention. Created business rules may be stored in a proprietary format or open format like, XPDL, XML, UML, and the like.

In one embodiment, the repository includes:
A storage subsystem in the form of a relational database, hierarchical database, set of disc files, or other persistent storage mechanism.
An access optimization subsystem in the form of caches, indexes and so on for fast, optimized access to stored flow graphs, methods, types, etc.
A path creation subsystem which allows to expand graphs along function invocations so that the stored paths are elementary and the analyzer can further expand graphs on demand.

In one embodiment, the analyzer includes:
A basic framework for plugging different pluggable processes.
Plugin applications with specific analysis algorithm implementations.
A flow graph walking subsystem, which can start at any point and walks through the execution path forward and/or backwards. The subsystem can on demand call the repository to expand flow graph traversed along function calls for more detailed analysis.

A pattern recognition subsystem (e.g., Rule Wizard™) capable to detect business rule violations (patterns) along traversed execution path in either direction.
A path validation subsystem that is capable of validating whether a given path can be actually executed. This subsystem utilizes user hints, symbolic execution, path dumps from actual software executions as well as other possible sources of information.

A control User Interface (UI) 118 drives the scanning and analysis processes. The UI 118 also provides configuration for which rules to use, how large the paths need to be (i.e., the maximum allowable length of each of the CFGs and DFGs), place limit on the maximum time spent on the analysis, and the like. A presentation UI 116 presents analysis results to the users.

Additionally, FIG. 1 presents an exemplary notion of breaking larger execution units, like files with source code, into smaller parts, like methods and functions. Each such entity is then converted into control flow graph 130. Each element of control flow graph, which contains execution statements and variables, has a created corresponding data flow graph 134.

Figure 2:
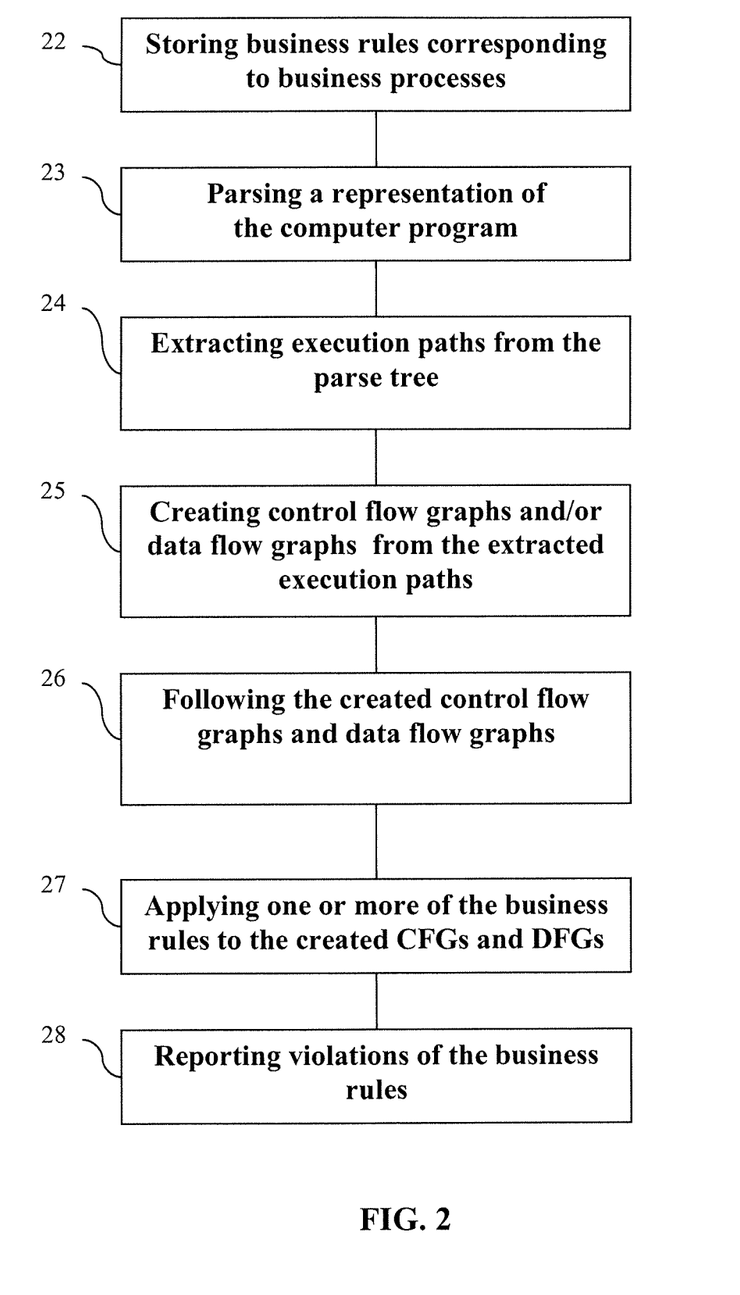
FIG. 2 shows a simplified process flow, according to some embodiments of the present invention.

FIG. 2 shows a simplified process flow, according to some embodiments of the present invention. As shown in block 22, a plurality of business rules corresponding to a plurality of business processes are stored in a repository, such as a file or a database. The business processes represent the behavior of an (business) enterprise. One example of a business rule can be that all loans of a certain amount must be approved by a certain person or department. Another example can be approving a business requirement only when the responsible people have signed off on it.

In block 23, a representation of the business process (in the computer program) is parsed, for example, by a scanner, to create a parse tree. The representation of the business process may be a BPEL parse tree, a XPDL parse tree, a WDSL parse tree, a spreadsheet from which a business process is then generated, or any other business language which can be represented as a parse tree.

Execution paths from the parse tree are then extracted from the parse tree, in block 24. DFGs and/or CFGs are created from the extracted execution paths, in block 25. CFGs and DFGs are adhered to one or more selected rules from the stored business rules. In some embodiments, the CFGs and DFGs are traversed and the business rules are checked as the program executes the CFG and DFG paths. The business rules may be generated by a static analysis rule creation software tool. In block 26, an analyzer follows the created control flow graphs and data flow graphs, and applies the selected one or more of the business rules to the created control flow graphs and data flow graphs, in block 27. In some embodiments, the CFGs and DFGs are tested to ensure that they comply with the rules, this can be done as the program executes through the paths of the CFGs and DFGs. In block 28, any violation of any of the applied rules is reported.

Runtime business rules (e.g., the stored business rules) can also be implemented for business processes. In some embodiments, the runtime engine acts as both the scanner and the analyzer. As the process executes, the execution engine takes flow-based rules and applies them along the execution path, verifying that everyone adheres to the defined processes. This can be used, for example, to monitor compliance to Sarbanes Oxley™ and other processes implemented for regulatory compliance.

Figure 3:
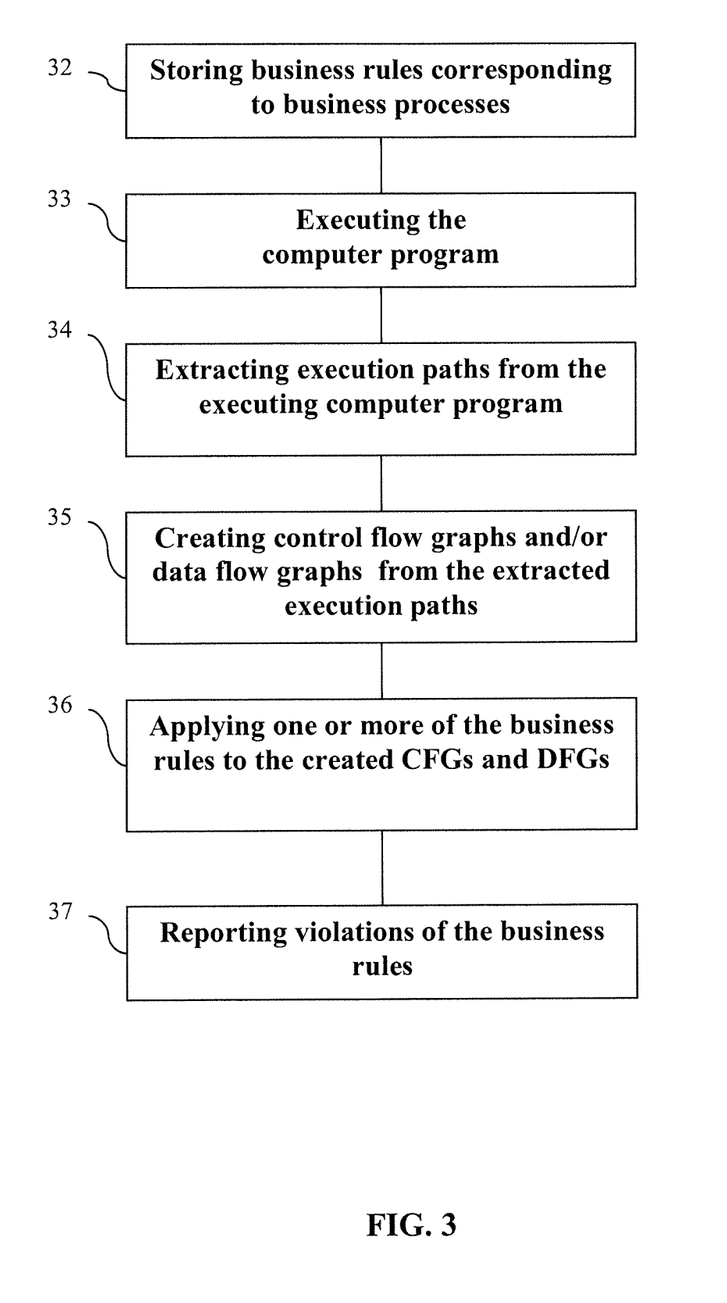
FIG. 3 shows a simplified process flow for runtime business rules, according to some embodiments of the present invention.

FIG. 3 shows a simplified process flow for runtime business rules, CFGs and DFGs, according to some embodiments of the present invention. As shown in block 32, a plurality of business rules corresponding to a plurality of business processes are stored in a repository, such as a file or a database. The business processes represent the behavior of an (business) enterprise.

Figure 4:
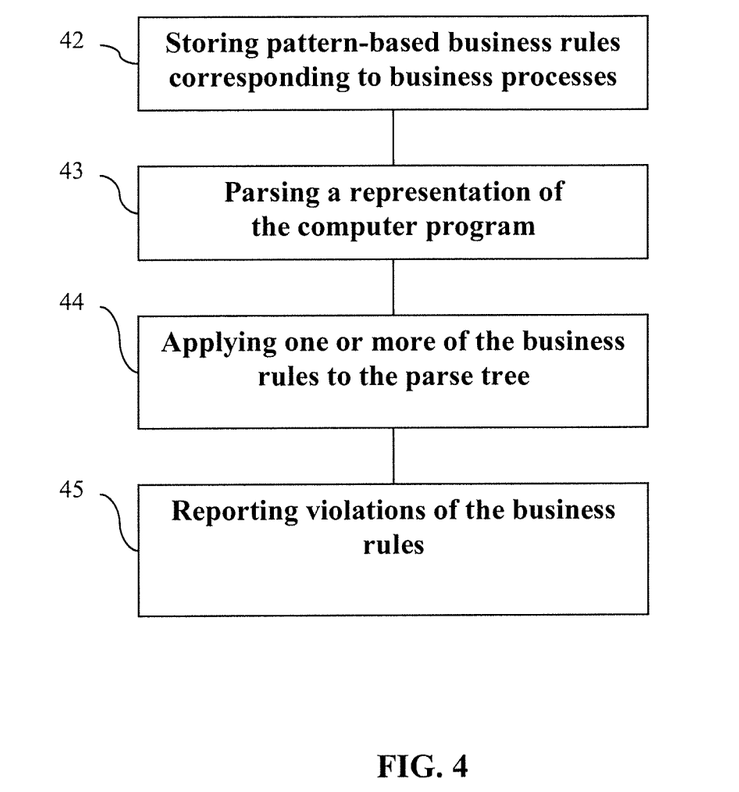
FIG. 4 shows a simplified process flow for pattern-based business rules, according to some embodiments of the present invention.

In block 33, the computer program is executed. Execution paths from the computer program being executed are then extracted from the parse tree, in block 34. DFGs and/or CFGs are created from the extracted execution paths, in block 35. CFGs and DFGs are adhered to one or more selected rules from the stored business rules. The business rules may be generated by a static analysis rule creation software tool. In block 36, the runtime engine follows the created control flow graphs and data flow graphs, and applies the selected one or more of the business rules to the created control flow graphs and data flow graphs, Any violation of the business rules is then reported, in block 37. FIG. 4 shows a simplified process flow for pattern-based business rules, according to some embodiments of the present invention. Typically, pattern based rules look for static patterns in the business process, such as making sure that anytime a person is asked to perform a task, that the business process verifies the task has been performed before moving on. As shown in block 42, a plurality of pattern-based business rules corresponding to a plurality of business processes are stored in a repository, such as a file or a database. Again, the business processes represent the behavior of an (business) enterprise. In block 43, a representation of the computer program is parsed, for example, by a scanner, to create a parse tree. The representation of the computer program may be a BPEL parse tree, a XPDL parse tree, a WDSL parse tree, a spreadsheet from which a business process is then generated, or any other business language which can be represented as a parse tree. In block 44, selected one or more of the pattern-based business rules are applied to the parse tree. Any violation of the business rules is then reported, in block 45.

BPEL, XPDL, and other such business process descriptions can also be generated from a simple input format, such as a spreadsheet, as described in more detail in the U.S. Provisional Patent Application No. 61/433,905, filed on Jan. 18, 2011, and entitled, "System and Method For Workflow Generation From Simple Input Format", the entire contents of which are hereby expressly incorporated by reference.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for enforcing business rules in a computer program, using static analysis, the method comprising:
   storing a plurality of business rules to enforce respective plurality of business processes representing a behavior of an enterprise, wherein the plurality of business rules comprises at least one pattern-based business rule, at least one flow-based business rule, and at least one runtime business rule;
   parsing a representation of each of the business processes in the computer program to create a business process graph for each of the business processes that represent the behavior of the enterprise;
   identifying execution paths for each of the business processes from the business process graphs;
   creating control flow graphs and data flow graphs from the identified execution paths for each of the business processes;
   adhering the created control flow graphs and data flow graphs to the plurality of business rules by combining control flow graphs and data flow graphs for two or more related business processes that represent the behavior of the enterprise;
   applying said one or more of the stored business rules to the combined control flow graphs and data flow graphs; and
   reporting whether any of the applied rules is violated.

2. The method of claim 1, further comprising creating said plurality of business rules using a static analysis rule creation software tool.

3. The method of claim 1, wherein the representation of the computer program is in a form of Business Process Execution Language (BPEL).

4. The method of claim 1, wherein the business process graphs are in a form of Web Services Description Language (WSDL) graphs.

5. The method of claim 1, wherein the business process graphs are in a form of XML Process Definition Language (XPDL) parse graphs.

6. The method of claim 1, wherein the parsed representation of the business processes is in a form of a spread sheet.

7. The method of claim 1, wherein the plurality of business rules is in one or more of the group consisting of XPDL format, XML format, and UML format.

8. The method of claim 1, further comprising utilizing a user interface for placing a limit on a maximum time spent for detecting said defects in the behavior of the enterprise.

9. The method of claim 1, further comprising utilizing a user interface for placing a limit on a maximum allowable length of said created control flow graphs and data flow graphs.

10. A computer implemented method for enforcing business rules in a computer program, the method comprising:
    storing a plurality of business rules to enforce a plurality of business processes representing a behavior of an enterprise, wherein the plurality of business rules comprises at least one pattern-based business rule, at least one flow-based business rule, and at least one runtime business rule;
    executing the computer program;
    identifying execution paths for each of the business processes from the computer program being executed;
    creating control flow graphs and data flow graphs for each of the business processes from the identified execution paths;
    adhering the created control flow graphs and data flow graphs to the plurality of business rules by combining control flow graphs and data flow graphs for two or more related business processes that represent the behavior of the enterprise;
    applying said one or more of the stored business rules to the combined control flow graphs and data flow graphs while the computer program is being executed; and
    reporting whether any of the applied rules is violated.

11. The method of claim 10, further comprising creating said plurality of business rules using a static analysis rule creation software tool.

12. The method of claim 10, wherein the plurality of business rules is in one or more of the group consisting of XPDL format, XML format, and UML format.

13. The method of claim 10, further comprising utilizing a user interface for placing a limit on a maximum time spent for detecting said defects in the behavior of the enterprise.

14. The method of claim 10, further comprising utilizing a user interface for placing a limit on a maximum allowable length of said created control flow graphs and data flow graphs.

\* \* \* \* \*

UNITED STATES PATENT AND TRADEMARK OFFICE
CERTIFICATE OF CORRECTION

| | |
|---|---|
| PATENT NO. | : 8,656,364 B1 |
| APPLICATION NO. | : 13/085254 |
| DATED | : February 18, 2014 |
| INVENTOR(S) | : Kolawa et al. |

It is certified that error appears in the above-identified patent and that said Letters Patent is hereby corrected as shown below:

In the Claims

Col. 8, line 24, Claim 6    Delete "wherein the parsed",
Insert --wherein the--

Signed and Sealed this
Tenth Day of February, 2015

Michelle K. Lee
*Deputy Director of the United States Patent and Trademark Office*